(12) United States Patent
Murakami et al.

(10) Patent No.: US 6,741,598 B1
(45) Date of Patent: May 25, 2004

(54) SWITCHING METHOD, SWITCHING EQUIPMENT AND SWITCHING NETWORK

(75) Inventors: Masaru Murakami, Yokohama (JP); Naruhito Nakahara, Yokohama (JP); Kota Miyoshi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/382,776

(22) Filed: Aug. 25, 1999

(30) Foreign Application Priority Data

Feb. 26, 1999 (JP) .......................................... 11-051829

(51) Int. Cl.$^7$ .......................... H04L 12/28; H04L 12/56
(52) U.S. Cl. ..................... 370/395.6; 370/466; 370/467
(58) Field of Search ............................. 370/395, 395.1, 370/389, 466, 398, 75, 395.6, 395.61, 395.64, 395.63, 395.65

(56) References Cited

U.S. PATENT DOCUMENTS

| | | | | |
|---|---|---|---|---|
| 5,553,069 A | * | 9/1996 | Ueno et al. .................. 242/308 |
| 5,838,679 A | * | 11/1998 | Kim et al. .............. 370/395.41 |
| 5,878,045 A | * | 3/1999 | Timbs .......................... 370/466 |
| 5,983,386 A | * | 11/1999 | Nakano et al. .............. 714/757 |
| 6,055,238 A | * | 4/2000 | Tanabe et al. ............... 370/398 |
| 6,108,336 A | * | 8/2000 | Duault et al. ............. 370/395.6 |
| 6,169,738 B1 | * | 1/2001 | Sriram et al. .......... 370/395.21 |
| 6,219,339 B1 | * | 4/2001 | Doshi et al. ................. 370/235 |
| 6,256,323 B1 | * | 7/2001 | Benayoun et al. .......... 370/474 |
| 6,266,343 B1 | * | 7/2001 | Caves ......................... 370/466 |
| 6,483,810 B1 | * | 11/2002 | Ono et al. ................... 370/244 |
| 6,483,838 B1 | * | 11/2002 | Ostman et al. ......... 370/395.31 |
| 6,504,845 B1 | * | 1/2003 | Petersen et al. ............. 370/412 |
| 6,519,261 B1 | * | 2/2003 | Brueckheimer et al. ...................... 370/395.52 |
| 6,574,224 B1 | * | 6/2003 | Brueckheimer et al. . 370/395.6 |
| 6,603,767 B1 | * | 8/2003 | Murakami et al. ..... 370/395.64 |

FOREIGN PATENT DOCUMENTS

WO    WO 95/17789    6/1995

OTHER PUBLICATIONS

Boldt, et al., "Modeling an ATM–Based Access Network for 3$^{rd}$ Generation Mobile Communication Networks", Vehicular Technology Conference, 1998, pp. 2590–2593.

Zsehong et al., "Performance Analysis of Two Echo Control Designs in ATM Networks", IEEE/ATM Transactions on Networking, vol. 2, No. 1, pp. 30–39.

\* cited by examiner

*Primary Examiner*—Wellington Chin
*Assistant Examiner*—Jamal A. Fox
(74) *Attorney, Agent, or Firm*—Antonelli, Terry, Stout & Kraus, LLP

(57) ABSTRACT

A switching method, switching equipment and a switching network are provided by each of which the data is transferred economically and with small transfer delay and the unit to which the data is to be transferred is selected every channel. In AAL type apparatuses, CPS packets a, b, c and d in which the voice data signals are encoded and the like are processed with an AAL type 2 to be multiplexed in ATM cells. The ATM cells in which the CPS packets are multiplexed are inputted to switching equipment. By a voice data decode unit within the switching equipment, for example, the CPS packets a and b are decoded into PCM codes a' and b', respectively. ATM cells of an ATM type 1 in which the CPS packets a', b', y' and z' are multiplexed are generated by a channel switching unit within a network to be suitably inputted to AAL type 1 apparatuses.

13 Claims, 11 Drawing Sheets

SWITCHING METHOD, SWITCHING EQUIPMENT AND SWITCHING NETWORK

BACKGROUND OF THE INVENTION

The present invention relates in general to a switching method, switching equipment and a switching network, and more particularly to switching of cells which are transferred with an ATM (Asynchronous Transfer Mode) and a switching network.

As a switching method in a public network, at the present time, the STM (Synchronous Transfer Mode) is employed. In the STM, the switching processing is executed in time slots within a frame. As an example of such a frame structure, there is known a frame structure in which in a DS1 transferred at a signal rate of 1.544 Mbits/sec, a set of 193 bits is treated as one frame, the first bit is the bit which is used to carry out the frame synchronization and the like and with respect to the bits from the second bit on, 8 bits are treated as 1 channel (time slot) so that 24 channels are assigned. The existing STM network executes the switching processing in channels. On the other hand, in the ATM, for a ATM cell of 53 bytes consisting of a header part of 5 bytes and an information part (payload) of 48 bytes, the switching processing is executed in ATM cells on the basis of the information contained in the header.

In general, in the ATM and the like, it is conceivable that the various media such as voice and data are handled. Since the character is different between the voice and the data, the processing layer for converting the respective media signals into the ATM signals, i.e., an AAL (ATM Adaptation Layer) is defined in the ITU-T I. 363 series. For example, when converting the existing STM signal into the ATM signal, an AAL type 1 is used, when transferring the encoded voice data, an AAL type 2 is used, an AAL type 5 is used for the variable length packet data, and so forth.

Now, the description will hereinbelow be given with respect to the delay when transferring the information relating to voice or the data. In the case where one ATM connection is simply given to one channel of the STM signal, since when generating one ATM cell, the ordering of the ATM cell is waited until data for 48 bytes has been well arranged, the delay will occur. More specifically, in order that one ATM cell may be generated with the signals of only one channel at a signal rate of 64 kbits/sec, it takes about 6 msec with 125 μsec×48 frames (bytes). Therefore, as the method of shortening a time to generate the ATM cell when converting the existing STM signal into the ATM signal, there is known the method of assigning a plurality of channels in the STM to one ATM connection. This method is defined as the Structured Data Transfer Method of the AAL type 1 in ITU-T I. 363.1. When adopting this method, if for example, one ATM cell is generated with signals of 24 channels at a signal rate of 64 kbits/sec, then the ATM is generated for a time of about 0.25 msec (125 μsec×24 channels×2 frames), and hence the delay in generation of the ATM cell can be reduced. Similarly, in order to reduce the delay when transferring the encoded voice data packet, the method wherein the CPS (Common Part Sublayer) packets to which the CIDs (Channel Identifiers) used to identify the channels are added are multiplexed in one ATM connection is to be transferred is defined in the AAL type 2 in ITU-T I. 363. 2.

Next, the description will hereinbelow be given with respect to the method of identifying the channels when signals of a plurality of channels are multiplexed in the ATM cells as described above. In the Structured Data Transfer Method of the AAL type 1, the variable length block is generated with signals of a plurality of channels which are handled in the STM signals and the resultant block is transferred through one ATM connection. In accordance with this Structured Data Transfer Method, since the transfer is carried out with the offset signal exhibiting the location of the boundary between the blocks contained within the payload of the ATM cell, the block can be generated on the reception side by utilizing that offset signal. In this connection, into which location within the block which channel is inserted is predetermined between the offices, whereby the respective channels can be identified on the reception side.

In addition, in the AAL type 2, since the CID is added each of the CPS packets, the channels of the CPS packets can be identified on the basis thereof.

SUMMARY OF THE INVENTION

In the conventional Structured Data Transfer Method of the AAL type 1, as described above, a plurality of channels are assigned to one ATM connection. For this reason, the signals of a plurality of channels are necessarily transferred to the same destination. On the other hand, if the ATM connections are assigned to the respective units to which the signals of a plurality of the channels are to be transferred, then there arises the problem that the delay will be increased as described above. This is also applied to the AAL type 2 with which the encoded voice data is transferred. As for the method of reducing the delay time, for example, there is known a partially filled cell method which is shown in ITU-T I. 363. 1. This method is such that the user information is contained in a part of the ATM cell and the dummy fill is contained in the remaining part. In the case of this method, however, since the meaningless signal is necessarily contained in the ATM cell, the number of cells in the switching equipment or the network is increased. This exerts an influence on the traffic characteristics. In order to solve this problem, the internal signal transfer speed needs to be increased. This is not economical.

In the light of the foregoing, the present invention has been made in order to solve the above-mentioned problems associated with the prior art. It is therefore an object of the present invention to provide a network, switching equipment and a switching system by which when signals of a plurality of channels are transferred in the form of the ATM cells, the signals can be transferred economically and with small delay, and in addition thereto, the unit to which the signals are to be transferred can be selected every channel.

It is another object of the present invention to provide a technology by which when a voice data signal decode circuit is provided in a network, an encoded or decoded voice data signal can be transferred economically and with small delay and also the unit to which the signals are to be transferred can be selected for channels having different destinations.

It is still another object of the present invention to provide a technology by which since when signals of a plurality of channels which have been multiplexed by the Structured Data Transfer Method of the AAL type 1 or signals of a plurality of channels which have been multiplexed the AAL type 2 are intended to be transferred, those signals are transferred with those signals multiplexed, the transfer can be carried out economically and with small transfer delay, and the unit to which the signals are to be transferred can be selected every channel in a network and also the multiplexing can be made in the ATM cell every unit to which the signals are to be transferred.

It is yet another object of the present invention to provide switching equipment, a switching system and a network in which in a network in which cells subjected to the ordering of the ATM cells by utilizing a plurality kinds of AALs, the conversion of the AAL type, the conversion of the signals or the like (encoding, decoding, encryption or the like of codes) is carried out in such a way as to be able to interconnect those systems, so that information which has been contained in the ATM cell is transferred to a desired destination.

In order to solve the above-mentioned problems associated with the prior art, according to an aspect of the present invention, there is provided a network having a function of inputting first ATM cells which have been generated by multiplexing signals of a plurality of channels to switch signals of the plurality of the channels which are multiplexed in the plurality of first ATM cells to generate second ATM cells to output the second ATM cells thus generated. In addition, according to another aspect of the present invention, there is provided a network wherein the first ATM cells or the second ATM cells are each the ATM cells which are generated by the Structured Data Transfer Method of the AAL type 1 or the AAL type 2, or the ATM cells which are generated by an AAL type 5.

According to a first solution of the present invention, there is provided a switching method including the steps of:

inputting ATM cells of a first type which have been generated by multiplexing signals of a plurality of channels; and switching said signals of the plurality of the channels which are multiplexed in the plurality of ATM cells of the first type and converting the signals of the channels to the same destination into ATM cells of a second type which are employed by the same destination to output the ATM cells of the second type thus obtained.

According to a second solution of the present invention, there is provided a switching method including the steps of:

inputting ATM cells of a first type and ATM cells of a second type which have been generated by multiplexing signals of a plurality of channels having different destinations; and switching the signals of the plurality of the channels which are multiplexed in the plurality of ATM cells of the first type and the plurality of ATM cells of the second type, and converting the signals of the channels to the same destination into the ATM cells of the first type, the ATM cells of the second type or ATM cells of another type which are employed by the same destination to output the resultant ATM cells.

According to a third solution of the present invention, there is provided switching equipment including:

an ATM switch for accommodating therein a plurality of ATM lines to carry out switching with header information of ATM cells; and an ATM upper layer switch having an input and an output connected to the ATM switch for inputting ATM cells of a first type which have been generated by multiplexing signals of a plurality of channels and switching the signals of the plurality of the channels which are multiplexed in the plurality of ATM cells of the first type to generate ATM cells of a second type to output the ATM cells of the second type thus generated to the ATM switch.

According to a fourth solution of the present invention, there is provided switching equipment including:

a first ATM upper layer switch for accommodating therein a plurality of ATM lines and inputting ATM cells of a first type which have been generated by multiplexing signals of a plurality of channels and switching the signals of the plurality of the channels which are multiplexed in the plurality of ATM cells of the first type to output the resultant signals;

an ATM cell switch connected to the first ATM upper layer switch for carrying out switching with header information of the ATM cells; and a second ATM upper layer switch having an input and an output connected to the ATM cell switch for inputting the ATM cells of the first type which have been generated by multiplexing signals of the plurality of the channels and switching the signals of the plurality of the channels which are multiplexed in the plurality of ATM cells of the first type to generate ATM cells of a second type to output the ATM cells of the second type thus generated.

According to a fifth solution of the present invention, there is provided a switching network including a plurality of switching equipment as described above, wherein a source which will employs ATM cells of a first type inputs the ATM cells of the first type which have been generated by multiplexing signals of a plurality of channels; the signals of the plurality of the channels are switched which are multiplexed in the plurality of ATM cells of the first type, and the signals of the channels to the same destination are converted into ATM cells of a second type which are employed by the same destination to be outputted; and the same destination receives the ATM cells of the second type.

Other objects, features and advantages of the present invention will become apparent from the description of the embodiments of the invention taken in conjunction with the accompanying drawings.

DESCRIPTION OF THE EMBODIMENTS

The preferred embodiments of the present invention will hereinafter be described in detail with reference to the accompanying drawings.

(1) Network and Switching Equipment According to First Embodiment

Figure 1:
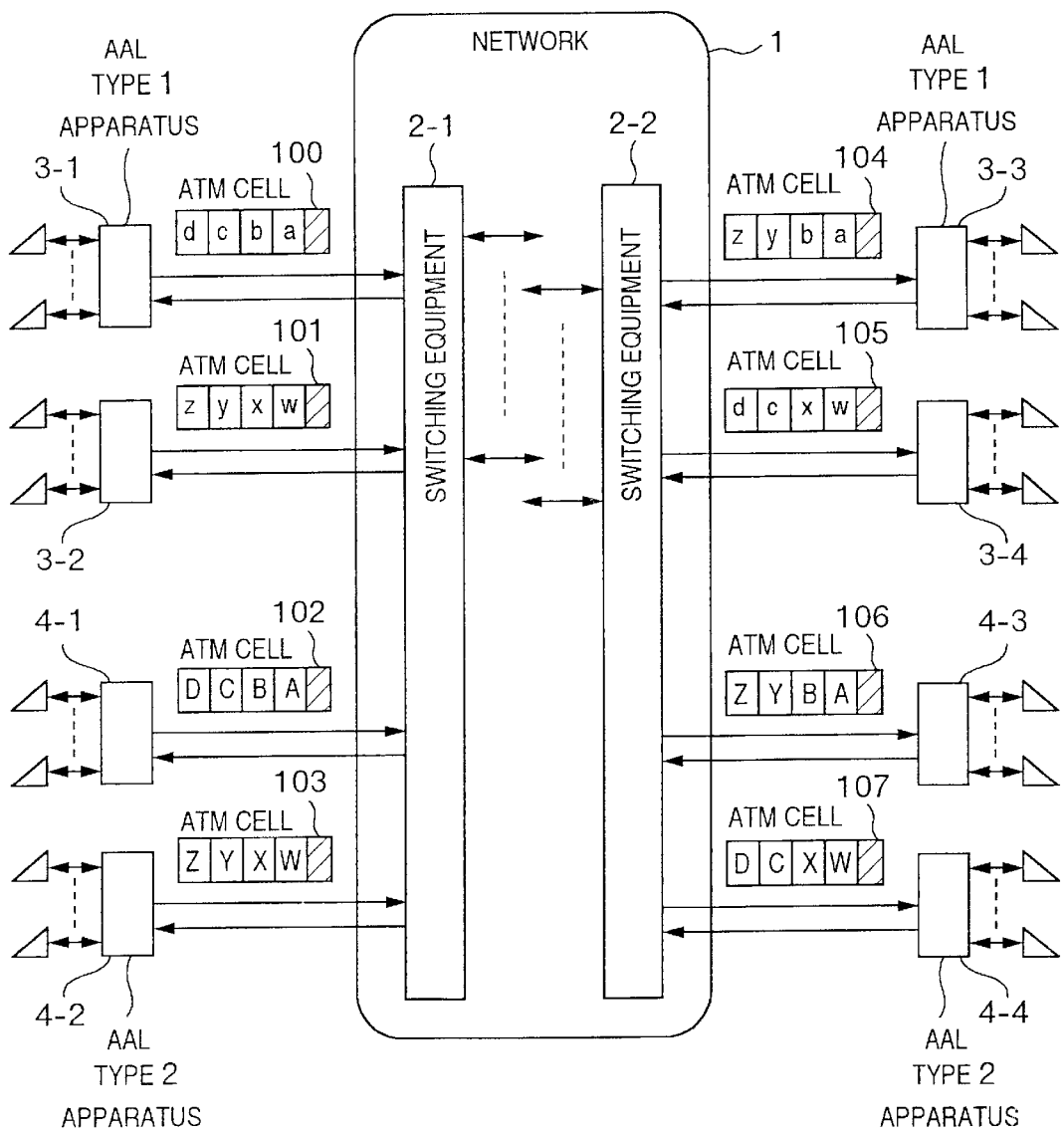
FIG. 1 is a block diagram showing a configuration of a first embodiment of a network according to the present invention.

FIG. 1 is a block diagram showing a configuration of a first embodiment of a network according to the present invention.

In FIG. 1, there is shown the situation in which a processing for an AAL type 1 is executed by an AAL type 1 apparatus 3-1 to generate an ATM cell 100, and signals a, b, c and d of channels are transferred in the form of that ATM cell to a network 1. In addition, in an AAL type 1 apparatus 3-2, signals w, x, y and z of channels are transferred in the form of an ATM cell 101 to the network 1. In this connection, the signals a, b, y and z which are multiplexed in the ATM cells 100 and 101 are addressed to an AAL type 1 apparatus 3-3, and the signals w, x, c and d which are also multiplexed in the ATM cells 100 and 101 are addressed to an AAL type 1 apparatus 3-4. In this case, the AAL type 1 apparatuses 3-1 and 3-2 input respectively the ATM cell 100 containing therein the signals a, b, c and d and the ATM cell 101 containing therein the signals w, x, y and z to the network 1 and the signals of the channels are switched by the switching equipment 2-1 and 2-2. Then, an ATM cell 104 containing therein the signals a, b, y and z and an ATM cell 105 containing therein the signals w, x, c and d are outputted from the network 1 to be sent to the AAL type 1 apparatuses 3-3 and 3-4, respectively.

In a similar way, an AAL type 2 processing is executed by AAL type 2 apparatuses 4-1 and 4-2, an ATM cell 102 containing therein CPS packets A, B, C and D and an ATM cell 103 containing therein CPS packets W, X, Y and Z are both inputted to the network 1, and the signals of the channels are switched by the switching equipment 2-1 and 2-2. In addition, an ATM cell 106 containing therein the CPS packets A, B, Y and Z and an ATM cell 107 containing therein the CPS packets W, X, C and D are both outputted from the network 1 to be transmitted to AAL type 2 apparatuses 4-3 and 4-4, respectively.

Figure 2:
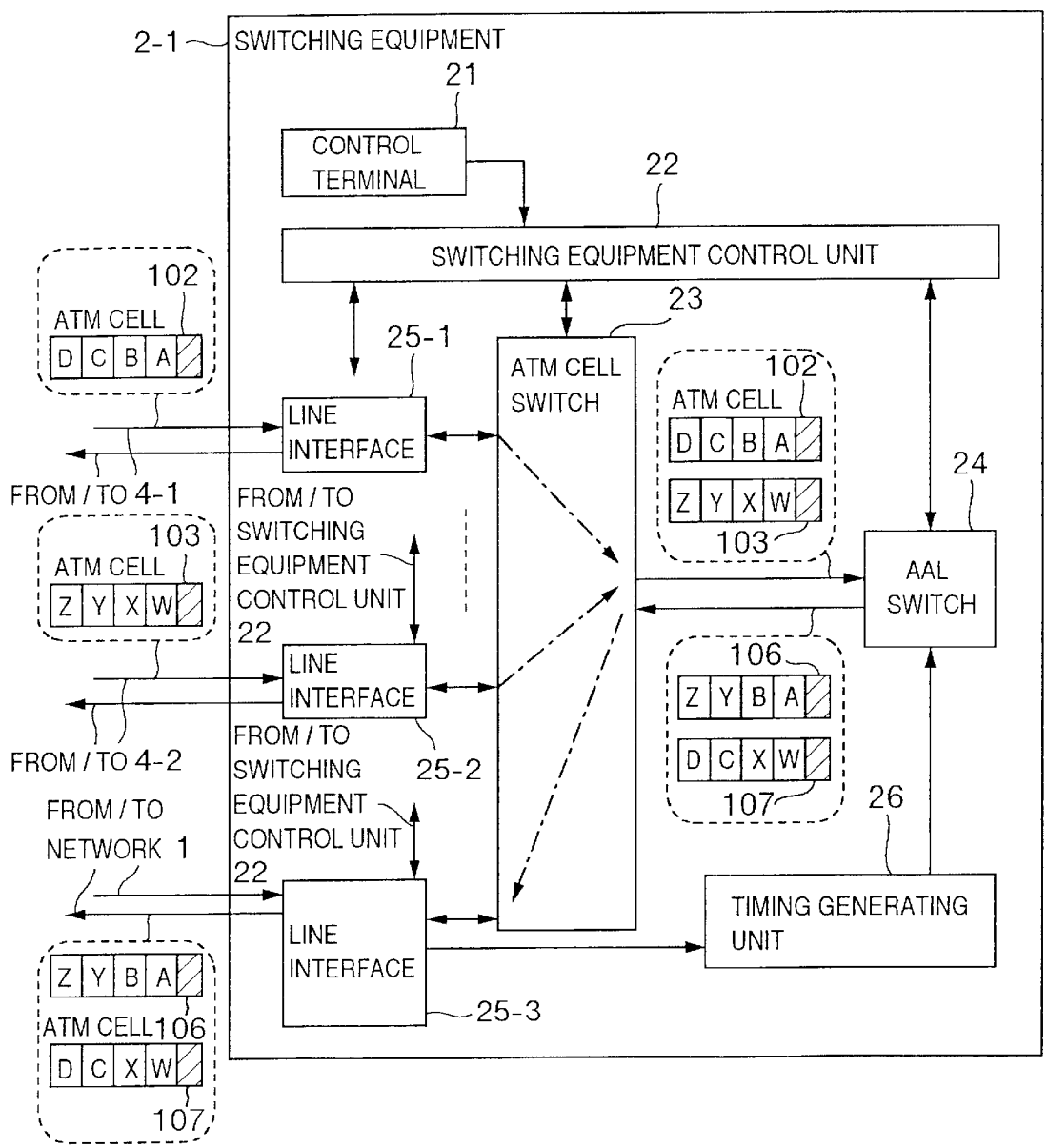
FIG. 2 is a block diagram showing a configuration of switching equipment installed in the network.

FIG. 2 is a block diagram showing a configuration of switching equipment according to the present invention which is installed in the network. In FIG. 2, there is shown an example in which the CPS packets are switched which are multiplexed in the ATM cells with the AAL type 2.

The ATM cells 102, 103, 106 and 107 are respectively inputted to interfaces of the switching equipment 2-1 shown in FIG. 2. The signals are inputted/outputted to/from an ATM cell switch 23 through line interfaces 25-1, 25-2 and 25-3 with the ATM cell terminating both of a physical layer of the ATM cell and an ATM layer as a unit. The ATM cell switch 23 transfers (switches) the ATM cells, which have been inputted, to an output port on the basis of the header information of the ATM cells. The CPS packets A, B, C and D are multiplexed in the ATM cell 102 which has been inputted to the line interface 25-1, and the CPS packets W, X, Y and Z are multiplexed in the ATM cell 103 which has been inputted to the line interface 25-2. Since in the switching equipment 2-1 of the present invention, the CPS packets which are multiplexed in the ATM cells 102 and 103 are switched, and hence the signals are transmitted/received to/from an AAL switch 24 in which the ATM cells are temporarily disassembled into the CPS packets to carry out the switching every CPS packet, the output port information on the basis of which the ATM cells 102 and 103 are transferred to the AAL switch 24 is set in the line interfaces 25-1, 25-2 and the ATM cell switch 23, and those ATM cells are transferred to the AAL switch 24. The ATM cell in which the CPS packets A, B, C and D are multiplexed, and the ATM cell in which the CPS packets W, X, Y and Z are multiplexed are both inputted to the AAL switch 24. In the AAL switch 24, as will be described in detail later, the switching of the CPS packets is carried out, and the ATM cell 106 in which the CPS packets A, B, Y and Z are multiplexed and the ATM cell 107 in which the CPS packets W, X, C and D are multiplexed are both inputted to the ATM cell switch 23. On the basis of the setting of the output port information of the AAL switch 24 and the ATM cell switch 23, those ATM cells 106 and 107 are outputted to the line interface 25-3 to be transferred to the network 1.

The switching equipment 2-1 is configured in such a way that the information relating to the determination of the output port of the ATM cell switch 23, the information in which the respective ATM connections are of the AAL type 1 or the AAL type 2, and the information of the channel switching method in the AAL switch 24 are, for example, determined on the basis of the control signal contained in the ATM cell for the control signal which is transferred between the networks or the switching equipment, or are previously set as the office data in the functional block of the networks or the switching equipment from the network managing apparatus (not shown). When the control is carried out between the apparatuses on the basis of the transfer of the control signal and the like, a switching equipment control unit 22 sets the data in the line interfaces 25-1, 25-2 and 25-3, the ATM cell switch 23 and the AAL switch 24, which are provided in the apparatus, on the basis of the control signal which has been received from other network or switching equipment through the line interfaces 25-1, 25-2 and 25-3, respectively. In addition, when the office data is previously set, in response to the input through a control terminal 21, the switching equipment control unit 22 sets the data in the apparatus (the terminal 21 may be controlled by the network managing apparatus (not shown) in some cases).

In the Structured Data Transfer Method of the AAL type 1, after having generated the block which is synchronous with the clock in the network or the like, the signals are transferred. Therefore, the synchronous signal which is required to generate the block used to switch the channels by the AAL switch 24 is generated in a timing generating unit 26 to be transferred to the AAL switch 24. The timing generating unit 26 generates the signal on the basis of the clock which has been extracted through the line interface 25-3 connected to the network 1.

While above, the example has been described in which the signals which have been inputted through the line interfaces 25-1, 25-2 and 25-3, respectively, are transferred via temporarily the switch 24, it is to be understood that in the switching equipment according to the present invention, with respect to the ATM connection in which the channels in the insides of the ATM cells do not need to be switched, the output port of the ATM cell switch 23 is set to the line interfaces 25-1, 25-2 and 25-3 without via the AAL switch 24, whereby the switching can be carried out in ATM cells. The switching equipment of the present invention includes, in addition to the normal ATM switch for switching the ATM cells as described above, a processing (ATM) switch, in the upper layer, for executing the signal processing of disassembling each of the ATM cells at the AAL level to switch the signals which are multiplexed in the inside of the payload, wherein the switching function is distributed in accordance with the type of the ATM cell or the unit of switching the signals contained in the ATM cells in order to execute the desired processing. If such a configuration is adopted that those ATM switches are arranged into the hierarchy or the functions thereof are divided, then it is possible to provide the economical switching equipment since the switching equipment does not need to be configured in such a way as to include only the switch having the processing function as well of the upper layer. In addition, since with respect to the ATM cell requiring the processing of the upper layer, there is adopted such a configuration as to transfer that ATM cell to another ATM switch to process that ATM cell therein, the conventional ATM switching which does not require any of the processings of the upper layer may be carried out using the ATM switch which has been conventionally used and hence it is possible to realize the economical switching system. In addition thereto, since the sources of the switch can be assigned to the switching of the normal ATM cells, it is possible to provide the switching system in which it is difficult for the overcrowding and the cell loss to occur and which is excellent in the traffic characteristics. Further, since there is adopted such a configuration that the switches each having the processing function of the upper layer are distributively arranged, by only arranging suitably the upper layer processing switch corresponding to the various processing forms as shown in the embodiment as will be described later in accordance with the load, it is possible to provide a highly functional ATM switching equipment which has the various processing functions and in which even when the ATM cells are mixedly provided for which the ordering is carried out with a plurality kinds of AAL types, the interconnection can be readily carried out. In addition, since the upper layer switch can be simply selected, installed and exchanged, it is possible to provide switching equipment, a switching system and a network each of which has an economical configuration and each of which is excellent in maintenance and operation.

Figure 3:
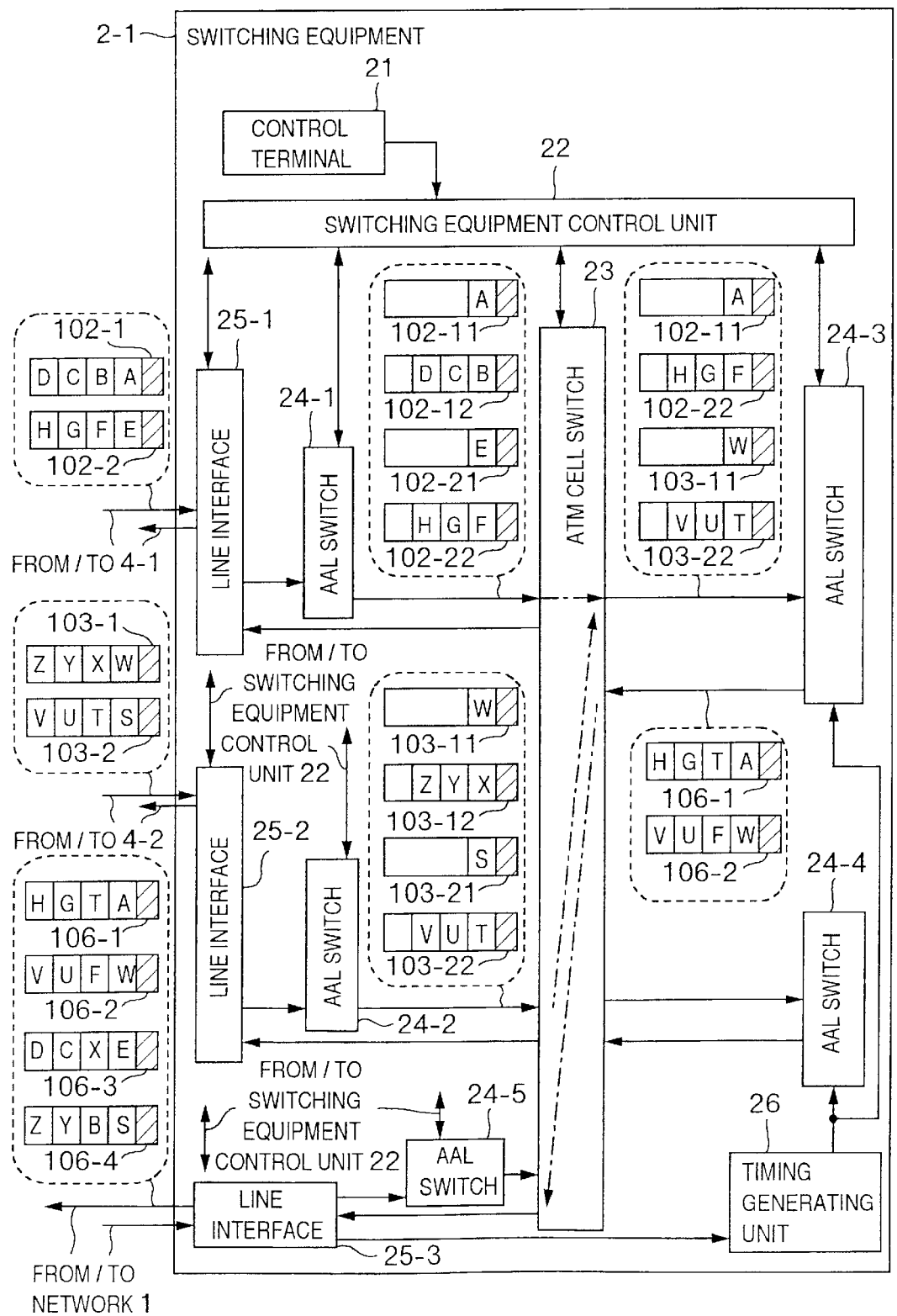
FIG. 3 is a block diagram showing another configuration of switching equipment installed in the network.

FIG. 3 is a block diagram showing another configuration of the switching equipment installed in the network.

In this case, there is shown an example of the coping method in the case where the traffic which is to be processed by the AAL switch is very large, and a plurality of AAL switches 24-1, 24-2, 24-3, 24-4 and 24-5 are provided in order to execute that processing. Other constituent elements are the same as those which are shown in FIG. 2 and which have been described with reference therewith. In this case, when the signals which have been inputted through the line interfaces 25-1 and 25-2 are distributed to the AAL switches as they are through only the ATM cell switch 23, those signals may not be successfully multiplexed in some cases. For this reason, the AAL switches 24-1 and 24-2 are provided between the line interfaces 25-1 and 25-2, and the ATM cell switch 23. By the provision of the AAL switches 24-1 and 24-2, the signals are switched in such a way that the ATM switch 23 can distribute the ATM cells which have been inputted to the switching equipment 2-1 to the AAL switches 24-3 and 24-4 which are provided in the after stage of the ATM switch 23. More specifically, the AAL switches 24-1 and 24-2 provided in the before stage of the ATM cell switch 23 are the switches which serve to temporarily separate and switch the signals which are previously multiplexed in the ATM cells to re-edit the contents of the signal multiplexing in the ATM cells inputted to the switching equipment 2-1 in such a way that the loads in the AAL switches 24-3 and 24-4 in the after stage of the ATM cell switch 23 can be adjusted and distributed. The ATM switch 23 transfers those ATM cells (102-11, 102-12, 102-21, 102-22, 103-11, 103-12, 103-21, 103-22, and the like) which have been re-edited to the AAL switches 24-3 and 24-4 in the after stage. This operation is the same as that in the above-mentioned embodiment. In addition, the AAL switches 24-3 and 24-4 in the after stage carry out the similar switching operation to that of the above-mentioned embodiment. While the description has been given with respect to the example in which the loads are distributed, there may be adopted the distributed function type configuration in which the ATM cells which have been inputted every type such as the cell of the AAL 1 type or the cell of the AAL 2 type are re-edited in the switches in the before stage, and also the signal processing such as the switching or the signal conversion is executed by the switches in the after stage. If as in the present invention, such a configuration is adopted that a plurality of upper layer switches are distributively arranged in the ATM switch, then the switching of the signals is distributed to the AAL switches 24-3 and 24-4. Therefore, in the case where the traffic is large, even when the cells of a plurality kinds of AAL types are required to execute the various kinds of signal processings, it is possible to provide switching equipment, a switching system and a network each of which can cope readily with such a case. Also, the number of upper layer switches can also be readily increased, and hence it is possible to simply provide a switching equipment, a switching system and a network each of which has the economical configuration and each of which is excellent in operation and maintenance.

In this example, the ATM cell 102-1 (A, B, C, D) is inputted through the line interface 25-1 and then is disassembled into the ATM cells 102-11 (A) and 102-12 (B, C, D) by the AAL switch 24-1. Likewise, the ATM cell 102-2 (E, F, C, H) is also inputted through the line interface 25-1 and then is disassembled into the ATM cells 102-21 (E) and 102-22 (H, G, F) to be re-edited by the AAL switch 24-1. On the other hand, the ATM cells 103-1 (Z, Y, X, W) and 103-2 (V, U, T, S) which have been inputted through the line interface 25-2 are, likewise, re-edited into the ATM cells 103-11 (W), 103-12 (X, Y, Z), 103-21 (S) and 103-22 (T, U, V) by the AAL switch 24-2, respectively. Now, if it is assumed that the ATM cells 102-11, 102-22, 103-11 and 103-22 have the header of the same destination, then those ATM cells are switched by the ATM cell switch 23 to be outputted to the AAL switch 24-3. Then, the AAL switch 24-3 switches those ATM cells which have been obtained by the re-edition to generate the ATM cells 106-1 (A, T, G, H) and 106-2 (W, F, U, V) every same destination to transfer the ATM cells thus generated to the ATM cell switch 23. The ATM cells 106-1 and 106-2 are transferred to the network through the line interface 25-3. Likewise, the ATM cells 102-12, 102-21, 103-12 and 103-21 are also supported by the AAL switch 24-4, and the ATM cells 106-3 (D, C, X, E) and 106-4 (Z, Y, B, S) are transferred to the network. The AAL switch 24-5 is also operated in the same manner as that in the AAL switches 24-1 and 24-2.

(2) Network of Second Embodiment

Figure 4:
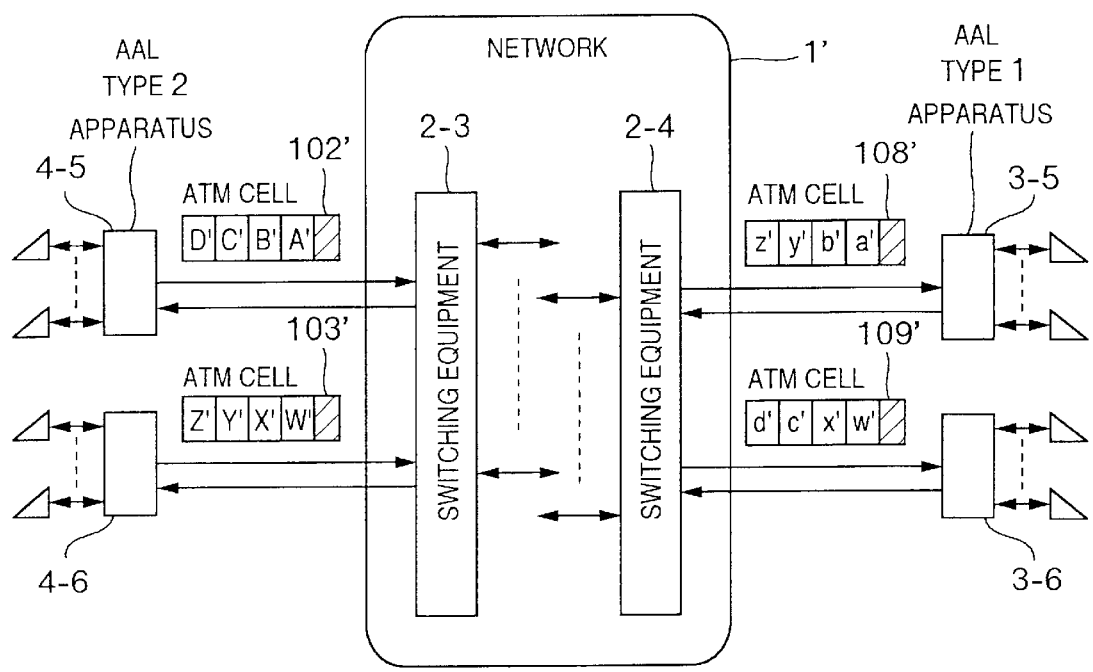
FIG. 4 is a block diagram showing a configuration of a second embodiment of the network according to the present invention.

The configuration of a second embodiment of the network according to the present invention is shown in the form of a block diagram in FIG. 4.

In FIG. 4, there is shown the situation in which the packets each including the encoded voice data are multiplexed with the AAL type 2 to be transferred to a network 1' and are decoded into the PCM codes by the voice data decode function within the network 1' and the resultant signals are multiplexed with the AAL type 1 to be transferred.

In FIG. 4, in AAL type 2 apparatuses 4-5 and 4-6, the CPS packets A', B', C' and D' , and W', X', Y' and Z' each including encoded voice data are processed with the AAL type 2 to be multiplexed in ATM cells 102' and 103', respectively. In addition, those signals are decoded into the PCM codes in such a way that for example, the CPS packet A' is decoded into a' and the CPS packet B' is decoded into b' by the voice data decode function within each of switching equipment 2-3 and 2-4. Further, ATM cells 108' and 109' of the ATM type 1 in which the CPS packets a', b', y' and z', and w', x', c' and d' are respectively multiplexed by the channel switching function within the network 1' are generated. The cells of the ATM type 1 are suitably inputted to AAL type 1 apparatuses 3-5 and 3-6. The switching equipment 2-3 and 2-4 shown in FIG. 4 has the same configuration as that of the switching equipment 2-1 and 2-2 shown in FIG. 2, and an AAL switch unit 24 in each of the switching equipment 2-3 and 2-4 is, as will be described later, further provided with a voice data decoder. The AAL switch 24 is provided with a voice data encoder for encoding the voice data with the similar configuration, whereby contrary to the above-mentioned example, the signal of the AAL type 1 can be converted into the signal of the AAL type 2.

(3) AAL Switch

Figure 5:
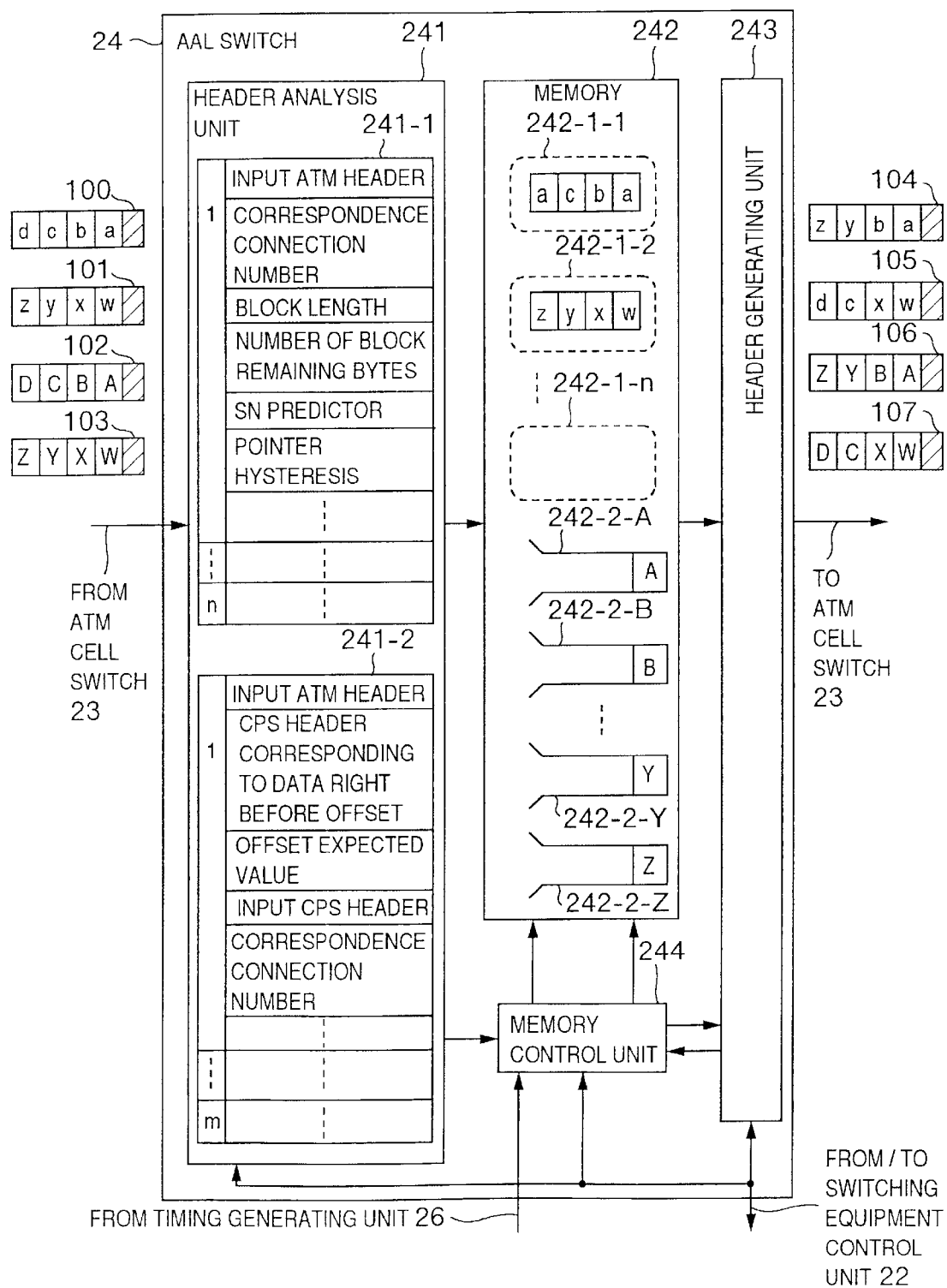
FIG. 5 is a block diagram showing a configuration of first embodiment of an AAL switch.

The configuration of a first embodiment of the AAL switch is shown in the form of a block diagram in FIG. 5.

After the ATM cells 100 (d, c, b, a) and 101 (z, y, x, w) which were structured by utilizing the Structured Data Transfer Method defined with the AAL type 1 have been inputted to the switch 24, the headers of the AAL cells are deleted and analyzed in a header analysis unit 241 and then the data in the payload unit is stored in blocks handled in the Structured Data Transfer Method in a memory 242 (stored in the insides 242-1-1 (a, c, b, a), 242-1-2 (z, y, x, w) to 242-1-n of the memory 242 every block). The data is read out from the memory 242 in accordance with the new multiplexing rule for the channels (packets) in the inside of the ATM cells to be generated, whereby the ATM cells 104 (z, y, b, a) and 105 (d, c, x, w) are generated in which the channels are switched. In addition, when the cells 102 (D, C, B, A) and 103 (Z, Y, X, W) of the AAL type 2 have been inputted, the CPS packets are stored in the memory 242 every channel (stored in insides 242-2-A (A), 242-2-B (B) to 242-2-Y (Y), 242-2-Z (Z) of the memory 242 every CPS packet). The CPS packets thus stored are read out in accordance with the new multiplexing rule, whereby the ATM cells 106 (Z, Y, B, A) and 107 (D, C, X, W) can be generated in which the CPS packets are switched.

First of all, for the ATM cell which has been inputted to the AAL switch 24, the ATM cell header thereof is analyzed in the header analysis unit 241. Since in the ATM cell of the AAL type 1, the structured data transfer block boundary can be detected on the basis of the offset information which is transferred only one time to the eight cells for one ATM connection in this header analysis, the data which is divided in blocks into the cells of the AAL type 1 is fetched to be stored in the memory 242. The information relating to the size of each of the blocks is structured in such a way that similarly to the settings within the above-mentioned switching equipment, the data is transferred on the basis of the control signal between the switching equipment, or the networks, and the data is set as the office data. The information relating to the size of each of the blocks is stored in a table 241-1 (1–n) which is provided in the header analysis unit 241 every reception ATM connection, and the control of writing the data of each of the blocks to the memory 242 is carried out in accordance with the contents of the table 241-1. In this example, the input ATM header, the corresponding connection number, the information relating to the block length, the information relating to the number of block remaining bytes, the SN predictor, the pointer hysteresis and the like are stored in the table 241-1. In addition, the check of the reception ATM cell sequence number, the processing of the offset information and the like are executed in the header analysis unit 241. Since those processings are executed in ATM connections, the data is stored in the table 241-1 in order to carry out the management every reception ATM connection for those processings (the table may be separated).

In the ATM cell of the AAL type 2, the offset is shown in the start field of the first byte of the ATM payload as shown by the recommendation, the head of the CPS packet is present in the location which is shown by that offset. That is, it is said that the data of the CPS packet, which is left since it is more than the ATM cell can accommodate therein, right before the same ATM connection fills up to right before the head location thereof. Therefore, the data up to right before the head location which is shown by the offset is stored in the memory 242 is such a way as to be linked to the CPS packet right, before the data. Since this processing is also executed every ATM connection, the information such as the channel information of the final CPS packet within the ATM cell, and the number of remaining bytes of the CPS packet which is inherited to the next ATM cell is managed every reception ATM connection by the table 241-2 and the control of writing the CPS packet to the memory 242 is carried out. In this example, the input ATM header, the CI's header corresponding to the data right before the offset, the offset expected value, the input CPS header, the corresponding connection number and the like are stored in the table 241-2 (1–m).

As described above, since the data which is multiplexed in the ATM cell which has been received every block in the AAL type 1 Structured Data Transfer Method, while every channel of the CPS packet in the AAL type 2 is stored in the memory 242, the switching of the channels in the AAL type 1 and the switching of the CPS packets in the AAL type 2, i.e., the switching of the information is carried out on the basis of the read control by the memory control unit 244. The details thereof will be specially described later with reference to FIGS. 9 to 11.

In the header generating unit 243, the ATM cell header as defined in the recommendation is added to the payload unit of the ATM cells which are switched by the AAL switch and in which the signals are multiplexed in accordance with the new multiplexing value. In addition, in the AAL type 1, the SAR-PDU (Segmentation and Reassembly—Protocol Data Unit) header and the pointer field are generated and so forth, while in the AAL type 2, the start field and the CPS packet header are generated and so forth.

Figure 6:
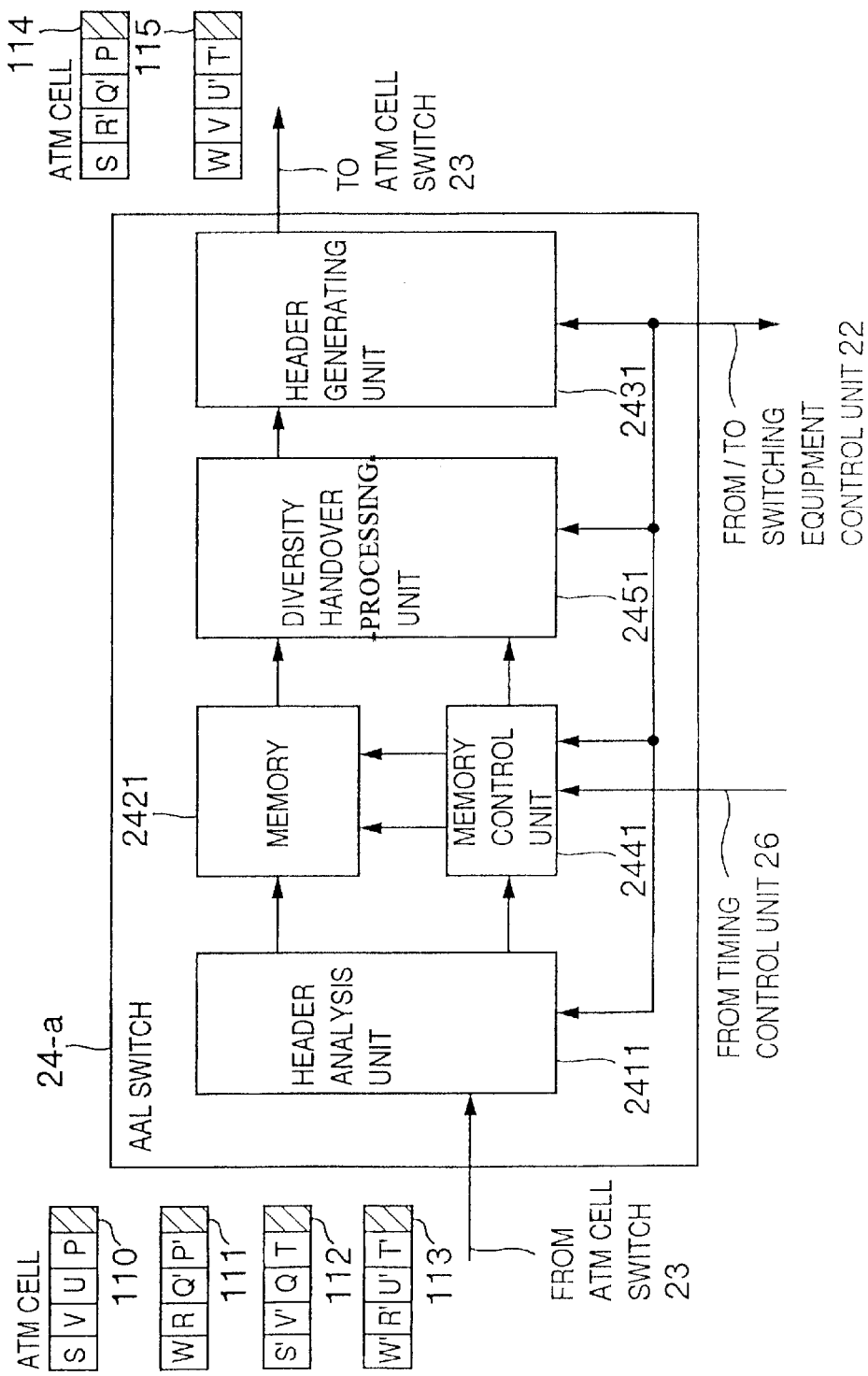
FIG. 6 is a block diagram showing a configuration of a second embodiment of an AAL switch.

The configuration of a second embodiment of the AAL switch is shown in the form of a block diagram in FIG. 6.

In an AAL switch 24-a, there is shown the configuration of a switch in which the switch for switching the signals which have been inputted with the AAL type 2 to output the signals thus switched as the signals of the AAL type 2 is additionally provided with a diversity handover processing function. Now, by the diversity handover is meant the means for selecting, in the radio communication, the data having the higher quality among the data which has been received from a plurality of radio lines or composing a plurality of data. That is, a certain mobile station sends the electric wave of the packet signal to different base stations, and each of the base stations obtains the quality of the received signal to transfer the signal together with the received packet signal to a mobile switching center. Then, the mobile switching center compares the qualities of the packet signals which have been transferred thereto from a plurality of base stations with one another to select the packet signal having the higher quality, or to compose the packet signals into a packet having the higher quality.

The channel as the object of the diversity handover is set from the switching equipment control unit 22 shown in FIG. 2 to a memory control unit 2441. In the—figure, for example, the CPS packets P, P', Q, Q', R, R', S, S', T, T', U, U', V, V' and W, W' are multiplexed in the ATM cells 110 to 113. Now, the CPS packets P and P' are paired for the diversity handover, and of the CPS packets P and P', the signal having the higher quality is selected to be multiplexed in the ATM cell to be outputted from the AAL switch 24. Likewise, the CPS packets Q and Q', R and R' etc. are respectively paired. The operation of a header analysis unit 2411 of the AAL switch 24 shown in FIG. 6 and the control of 10 writing the data to a memory 2421 are the same as those of the AAL switch 24 as have been described with reference to FIG. 5. As for the read control, the packets (e.g., P and P') which have been stored every CPS packet in the memory 2421 as an object of the diversity handover are successively read out to be transferred to a diversity handover processing unit 2451. At this time, the information exhibiting that those packets are the processing object of the diversity handover is also transferred together therewith. The packets each having the higher quality are transferred to a header generating unit 2431 in accordance with the quality information added to the packets to generate ATM cells 114 and 115. For example, the CPS packet P' is read out right after having read out the CPS packet P to compare the quality information which is added to those packets, respectively, so that one of the CPS packets P and P' is discarded and the other is passed. In the example shown in FIG. 6, there is shown the situation in which since the CPS packets P, Q', R', S, T', U', V and W have the higher quality, those CPS packets are ordered into the ATM cells (114 and 115) again. In this connection, since the unit, to which the signals are to be transferred, of the CPS packets P, Q', R' and S is different from that of the CPS packets T', U', V and W, those CPS packets are multiplexed in other ATM cells (114 and 115) as shown in FIG. 6.

Figure 7:
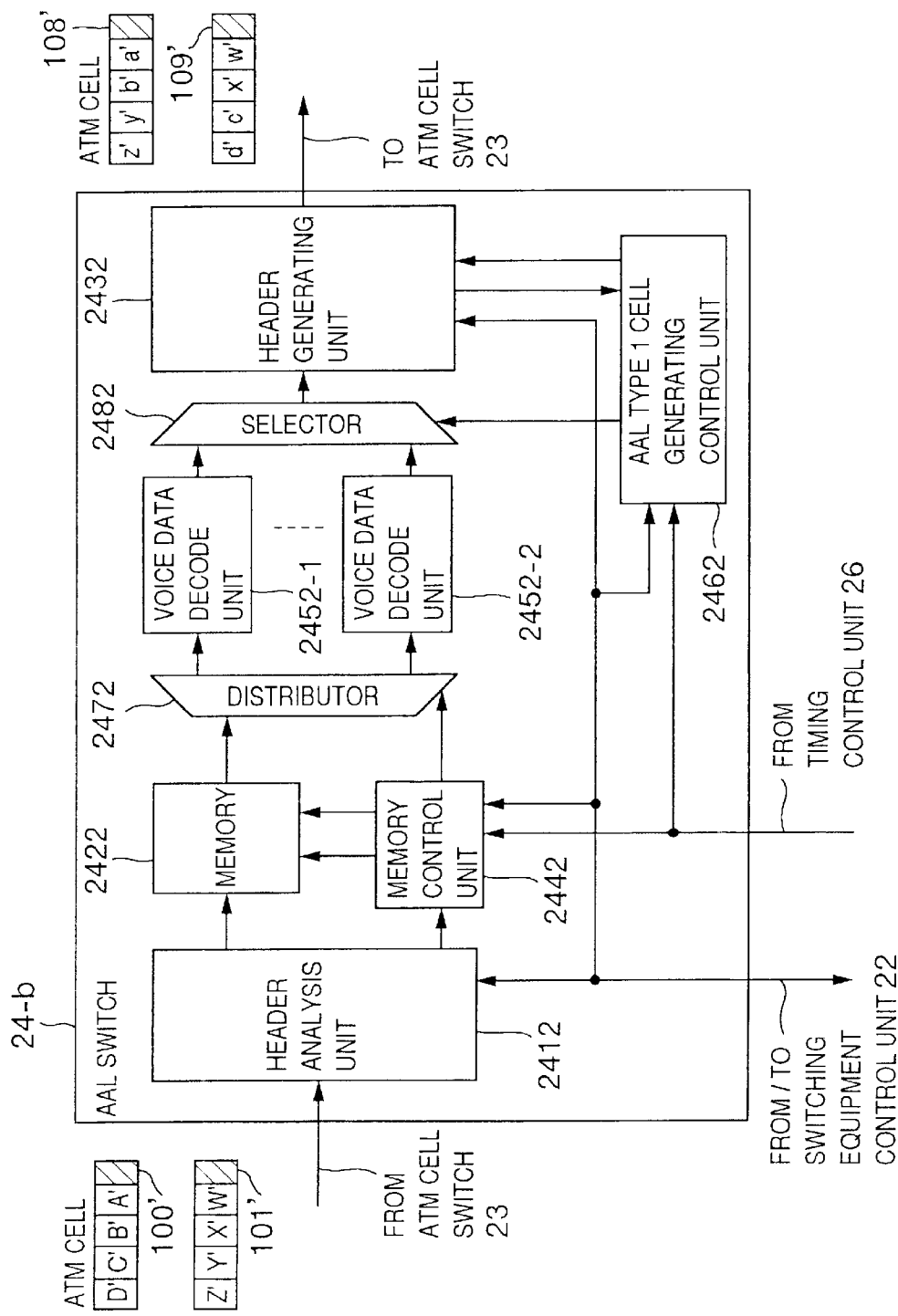
FIG. 7 is a block diagram showing a configuration of a third embodiment of an AAL switch.

The configuration of a third embodiment of the AAL switch is shown in the form of a block diagram in FIG. 7.

FIG. 7 shows a configuration of an AAL switch 24-b which is used within each of the switching equipment 2-3 and 2-4 included in the network 1' shown in FIG. 4. More specifically, the AAL switch 24-b is configured in such a way that the AAL switch 24 as has been described with reference to FIG. 5 is additionally provided with the voice data encode/decode function to carry out the switching of the information which is ordered into the ATM cell with the AAL type 1 and the information which is ordered into the ATM cell with the AAL type 2. An ATM cell 100' in which the CPS packets A', B', C' and D' are multiplexed and an ATM cell 101' in which the CPS packets W', X', Y' and Z' are multiplexed are both written to a memory 2422. The CPS packets A', B', C', D', W', X', Y' and Z' which have been read out from a memory 2422 are distributed to one of voice data decode units 2452-1 and 2452-2 through a distributor 2472, and the voice data decode units 2452-1 and 2452-2 decode the encoded voice data codes into the PCM codes to generate the CPS packets a', b', c', d', w', x', y' and z'. An AAL type 1 cell generation control unit 2462 controls a selector 2482 to multiplex the signals after decoding to generate the cells of the AAL type 1 after having added the new header thereto in a header generating unit 2432. At this time, similarly to the above-mentioned embodiment of the AAL switch, in the AAL switch 24-b, the switching of the channels of the packets which are multiplexed in the ATM cells in accordance with the destinations of the CPS packets is carried out, whereby it is possible to generate both of an ATM cell 108' containing therein the CPS packets a', b', y' and z' and an ATM cell 109' containing therein the CPS packet w', x', c' and d'.

Figure 8:
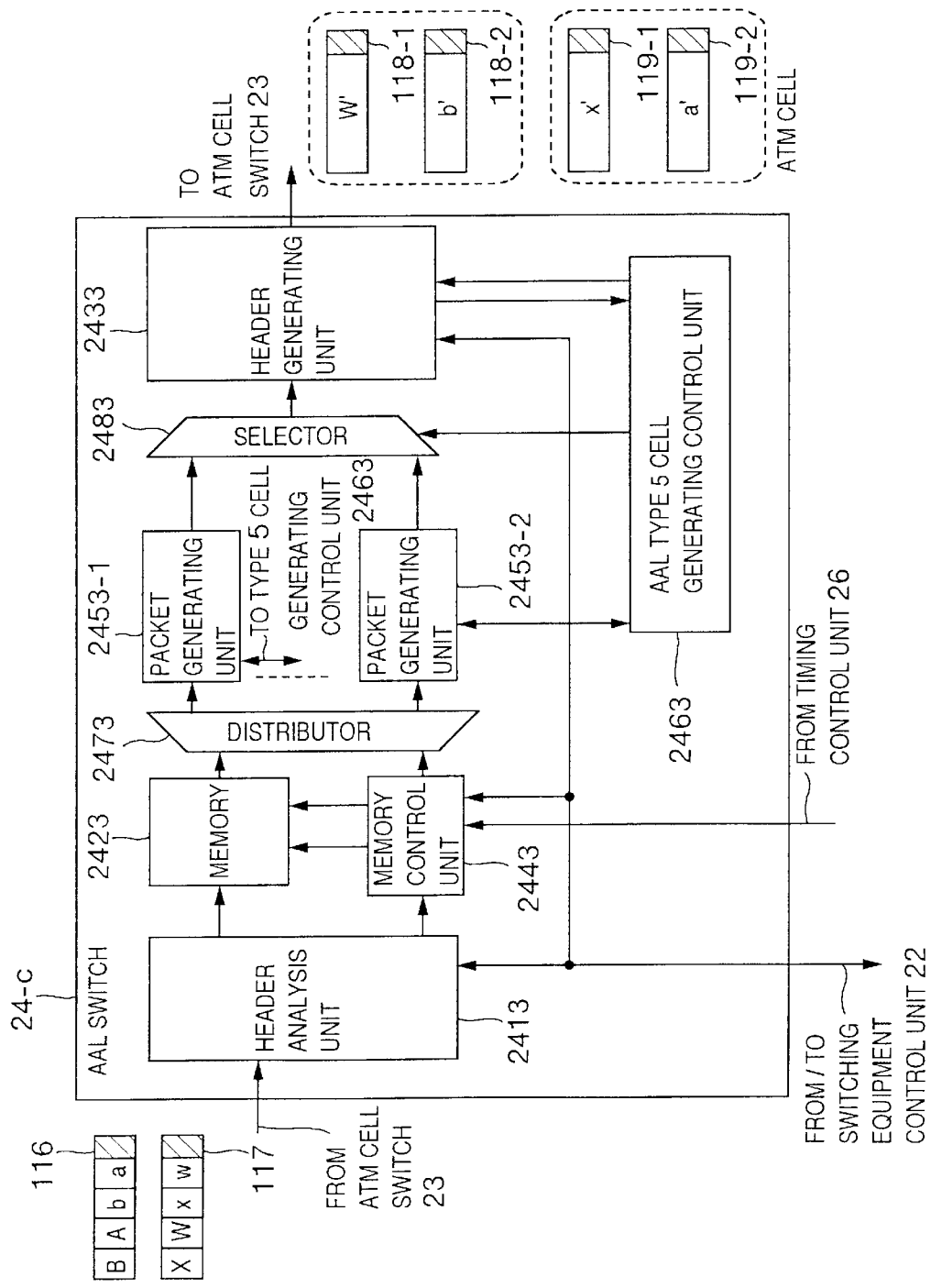
FIG. 8 is a block diagram showing a configuration of a fourth embodiment of an AAL switch.

The configuration of a fourth embodiment of the AAL switch is shown in the form of a block diagram in FIG. 8.

In FIG. 8, there is shown the situation in which a plurality of CPS packets, which are handled with the AAL type 2, are coupled to one another to generate one long packet and the long packet thus generated is transferred with the AAL type 5.

In an example shown in the figure, CPS packets a and A are coupled to each other to generate a new long packet a'. Then, the long packet a' thus generated is mapped, with the AAL type 5, on the ATM cell. Likewise, the CPS packets b and B are coupled to each other to generate a new long packet b' and the CPS packets w and W are coupled to each other to generate a new long packet w', and also the CPS packets x and X are coupled to each other to generate a new packet x'. When the long packet a' and the long packet x' are both transferred to the same unit, those long packets can be respectively contained in the ATM cells 119-1 and 119-2 having the same header. Likewise, when the long packet b' and the long packet w' are both transferred to the same unit, those packets can be respectively contained in the ATM cells 118-1 and 118-2 of the same header.

In the AAL switch 24-c shown in FIG. 8, the CPS packets contained in the ATM cells 116 and 117 of the AAL type 2 which have been inputted are, similarly to the AAL switch 24-b as have been described with reference to FIG. 7, written to a memory 2423. A memory control unit 2443 reads out the CPS packets from the memory 2423 in order to couple the CPS packets thus read out to one another, and controls the distributor 2473 to transfer the CPS packets thus coupled to one of packet generating units 2453-1 and 2453-2. In the packet generating units 2453-1 and 2453-2, a plurality of CPS packets (e,g., a and A) are coupled to one another to generate one long packet (e.g., a'). A selector 2483 is selected on the basis of the control made by an AAL type 5 cell generating control unit 2463, and the long packet which has been read out is ordered into the ATM cell in a header generating unit 2443 in accordance with the convention of the AAL type 5. The point that the switching can be carried out in such a way that in the present AAL switch 24-c as well, the long packet a' and the long packet x' are both transferred to the same unit and hence are made the same ATM connection, and the long packet b' and w' are also made the same ATM connection is similar to that in the above-mentioned embodiment. In this example, while not illustrated in any of the figures, if the AAL switch is provided with the function of the packet disassembly, then the signal conversion from the AAL type 5 to the AAL type 2 can be implemented in the reverse procedure to the present embodiment.

According to the present invention, the AAL switches as described above are combined with each other to be connected to the ATM switch, whereby the signal of the suitable AAL type can be converted into the signal of the suitable AAL-type to be transferred. In addition, the signals of the different AAL types having the same destination can be tied up in a bundle to be converted into the signal of the AAL type of the destination to be transferred.

(4) Internal Configuration of AAL Switch

The description will hereinbelow be given with respect to the detailed configuration of the memory control unit of the AAL switch which is included in the switching equipment of the present invention. While the description is given by taking as an example the control unit of the switch of the first embodiment shown in FIG. 5, it should be noted that the memory control units of the AAL switches 24-a to 24-c of other embodiments can also be configured in the same manner.

Figure 9:
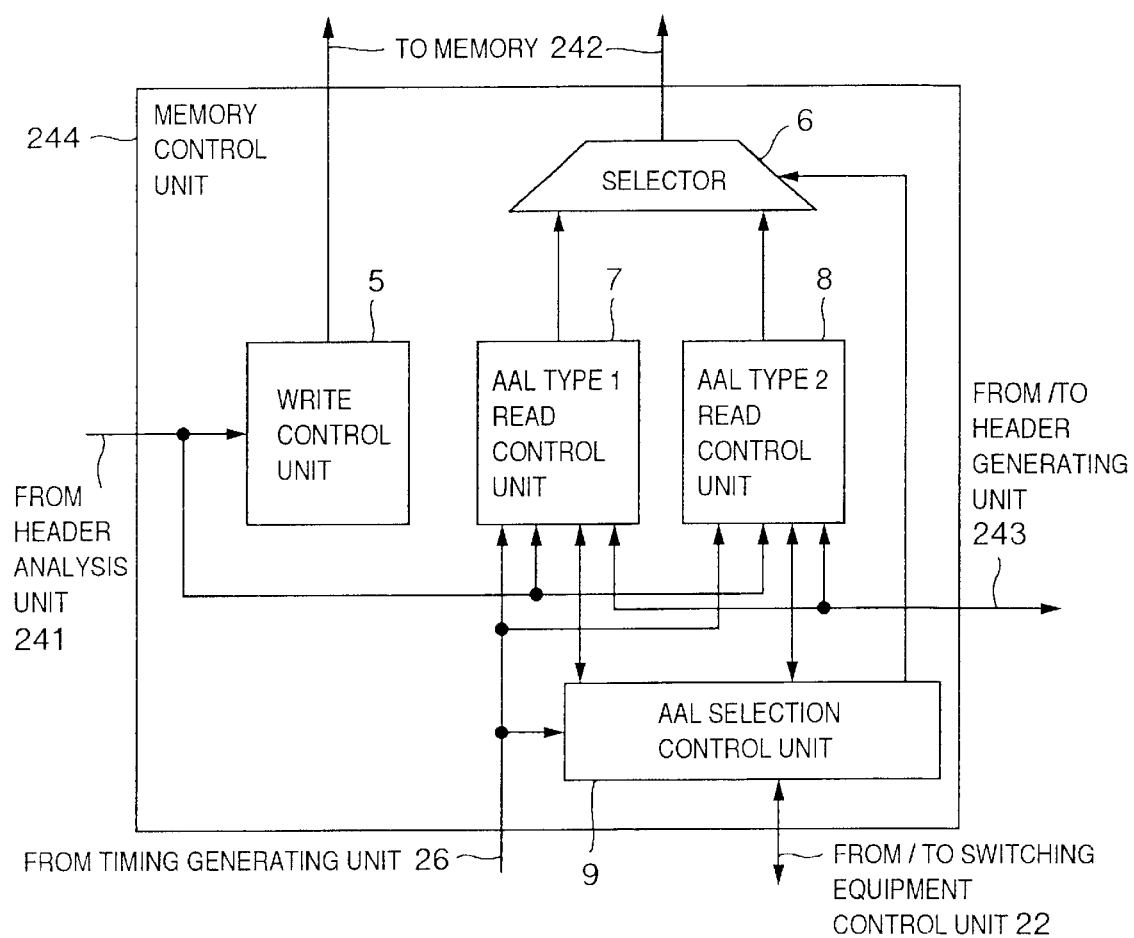
FIG. 9 is a block diagram showing a configuration of a memory control unit 244.

The configuration of a memory control unit 244 is shown in the form of a block diagram in FIG. 9.

The memory control unit 244 is the unit for controlling, as described above, the operation of writing and reading out the data to and from the memory 242. For the operation of writing the data to the memory, on the basis of the header analysis result provided by header analysis unit 241, a write control unit 5 carries out the control in such a way that in the case of the AAL type 1 Structured Data Transfer Method, the data is stored in the memory every structured block, while in the case of the AAL type 2, the data is stored in the memory every channel of the CPS packet.

With respect to whether the cell of the AAL type 1 is read out or the cell of the AAL type 2 is read out, there are known the method wherein the read schedule is instructed on the basis of the setting made by the switching equipment control unit 22, the method wherein the read instruction is issued in correspondence to the amount of data in the memory 242, and the like. The selection between the AAL type 1 and the AAL type 2 is carried out by the AAL selection control unit 9, and the signal which is used to control the memory 242 is transferred to the memory 242 after having passed through a selector 6 from a read control unit 7 or 8 on the read selection side.

The AAL type 1 read control unit 7 and the AAL type 2 read control unit 8 monitor the amount of data stored in the memory 242 by comparing the signal from the header analysis unit 241 with the information relating to the state of reading out the data from the memory 242 at all times. More specifically, the AAL type 1 read control unit 7 monitors whether or not the data for one block has been stored, while the AAL type 2 read control unit 8 monitors whether or not the data for one CPS packet has been stored. Further, it is monitored that the data from one cell is stored every read connection. In this connection, the AAL type 2 read control unit 8 generates one packet from a plurality of CPS packets, and when processing the signals in packets, monitors whether or not the data for one packet is stored at all times.

Figure 10:
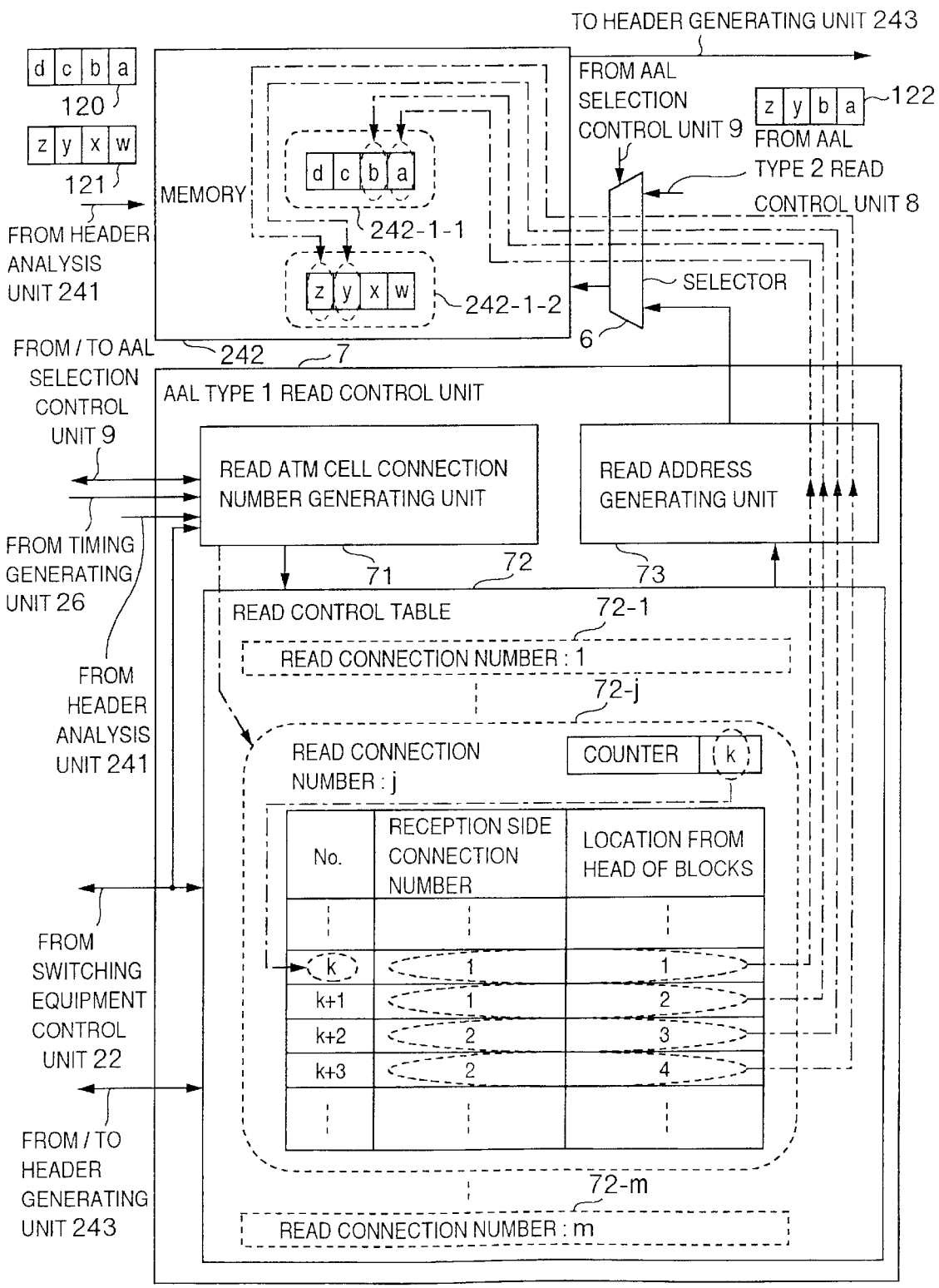
FIG. 10 is a block diagram showing a configuration of an AAL type 1 read control unit 7.

The configuration of the AAL type 1 read control unit 7 is shown in the form of a block diagram in FIG. 10.

When an AAL type 1/2 selection control unit 9 requires for a read ATM connection number generating unit 71 to read out the cells of the AAL type 1, the read ATM connection number generating unit 71 determines the read ATM connection through which the data is to be read out in blocks from the memory 242 by utilizing, for example, the method of reading out the information relating to the scheduling which is previously set by the switching equipment control unit 22 at the timing set by the timing generating unit 26 to transfer the information relating to the read ATM connection thus determined to a read control table 72.

The read control table 72 carries out the read scheduling in such a way as to change (switch) the order of reading out the data which is stored in the memory 242 every read ATM connection. To put it concretely, the table 72 exhibits the connection on the write side on the memory 242 and which block from the head of the blocks is a read object within that connection. The read address generating unit 73 generates a memory read address signal on the basis of that information to supply the address signal thus generated to the memory 242 through the selector 6, which makes possible the read of the ATM cell signal. In this connection, the contents of the read control table 72 are also, similarly to the settings within the apparatuses in the above-mentioned embodiments, implemented on the basis of the control signal between the switching equipment or the networks, or set by utilizing the method of carrying out the setting on the basis of the office data from the switching equipment control unit 22.

As for other methods of determining the read ATM connection, there are known the method of switching the current connection over to another connection after having read out a fixed amount of cells within a certain time period on the basis of the timing information which is synchronous with the network 1, the method of monitoring the storage amount of data stored in the memory and carrying out, when the storage amount of data has become larger than a certain threshold, the operation of reading out the corresponding connection, and the like. In order to implement the former method, the scheduling data which is set by the switching equipment control unit 22 is read out to a read ATM connection number generating unit 71 on the basis of the timing information which has been inputted from the timing generating unit 26 to generate the read ATM connection number, and so forth. In addition, in order to implement the latter method, the operation is carried out in such a way that when making the read request, that effect is transferred to the AAL type 1/2 selection control unit 7 on the basis of the storage amount of data stored in the memory 242, which is monitored at all times by the read ATM cell connection number generating unit 71, using the information from the header analysis unit 241, and thereafter the data is read out from the memory 242 in accordance with the read request made by the AAL type 1/2 selection control unit 9.

The signal of 46 bytes or 47 bytes with respect to the specified read ATM connection is read out from the read control table 72. Since when generating the cells of the ATM type 1 on the basis of the Structured Data Transfer Method, the offset information needs to be inserted into only one cell of the eight cells, the signal of 46 bytes is read out only in this case, while the signal of 47 bytes is read out in other cases. The switching of the numbers of read out bytes is carried out on the basis of the control signal outputted from the header generating unit 243. The read control table 72 has a counter table for the read ATM connection, and in correspondence to the value exhibited by the counter, the connection number on the reception side and the information relating to which block from the head of the blocks of the connection is to be read out are written to the read control table 72. When the read ATM connection has been specified, the value which is exhibited by the counter table is read out and thereafter, the values each for one cell are successively read out from the table 72. The contents of the counter table are updated by the number of bytes which have been read out to store the number of bytes thus read out therein. As a result, when the signal of the ATM connection is intended to be read out next time, the data for 46 bytes or 47 bytes from the location in which the above-mentioned scheduler was stopped may be read out. The read ATM cell connection number generating unit 71 monitors the amount of data stored in the memory 242 at all times and the information thereof is transmitted to the time slot switching scheduler table 72 and the block which is to be read out is determined on the basis of that information. The read address generating unit 73 obtains the actual address on the memory on the basis of the value which is exhibited by the time slot switching scheduler table.

For example, in the example shown in the figure, the read control table 72 stores therein the information relating to the set of the connection number on the reception side and the location from the head of the blocks within that connection every read connection number 1, ..., j, ..., m (72-1, 72-j, 72-m) and also stores therein the counter value k exhibiting which block from the head within that connection is a read object. The data 120 (a, b, c, d) which is multiplexed in the ATM cell is stored in the inside 242-1-1 of the memory 242, and the data 121 (w, x, y, z) which is multiplexed in another ATM cell is -stored in the inside 242-1-2 of the memory 242. The read control table 72 reads out "a" in the inside 242-1-1 of the memory 242 through the read address generating unit 73 and the selector 6 in (which also receives input from type 2 read control unit 8) accordance with the reception connection number "1" of No. k for the counter value "k", and the location "1" from the head of the blocks with respect to the read connection number j. Next, the counting operation is continued. Likewise, the read control table 72 reads out "b" in the inside 242-1-1 in accordance with the reception connection number"1" of No. k for the counter value "k+1", and the location "2" from the head of the blocks with respect to the read connection number j. Next, "y" in the inside 242-1-2 is read out in accordance with the reception connection number "2" of No. k for the counter value "k+2", and the location "3" from the head of the blocks with respect to the read connection number j, and then "z" in the inside 242-1-2 is read out in accordance with the reception connection number "2" of No. k" for the counter value "k+3", and the location "4" from the head of the blocks with respect to the read connection number j.

In a manner as described above, the ATM cell 122 (a, b, y, z) is read out from the memory 242 to be transferred to the header generating unit 243.

Figure 11:
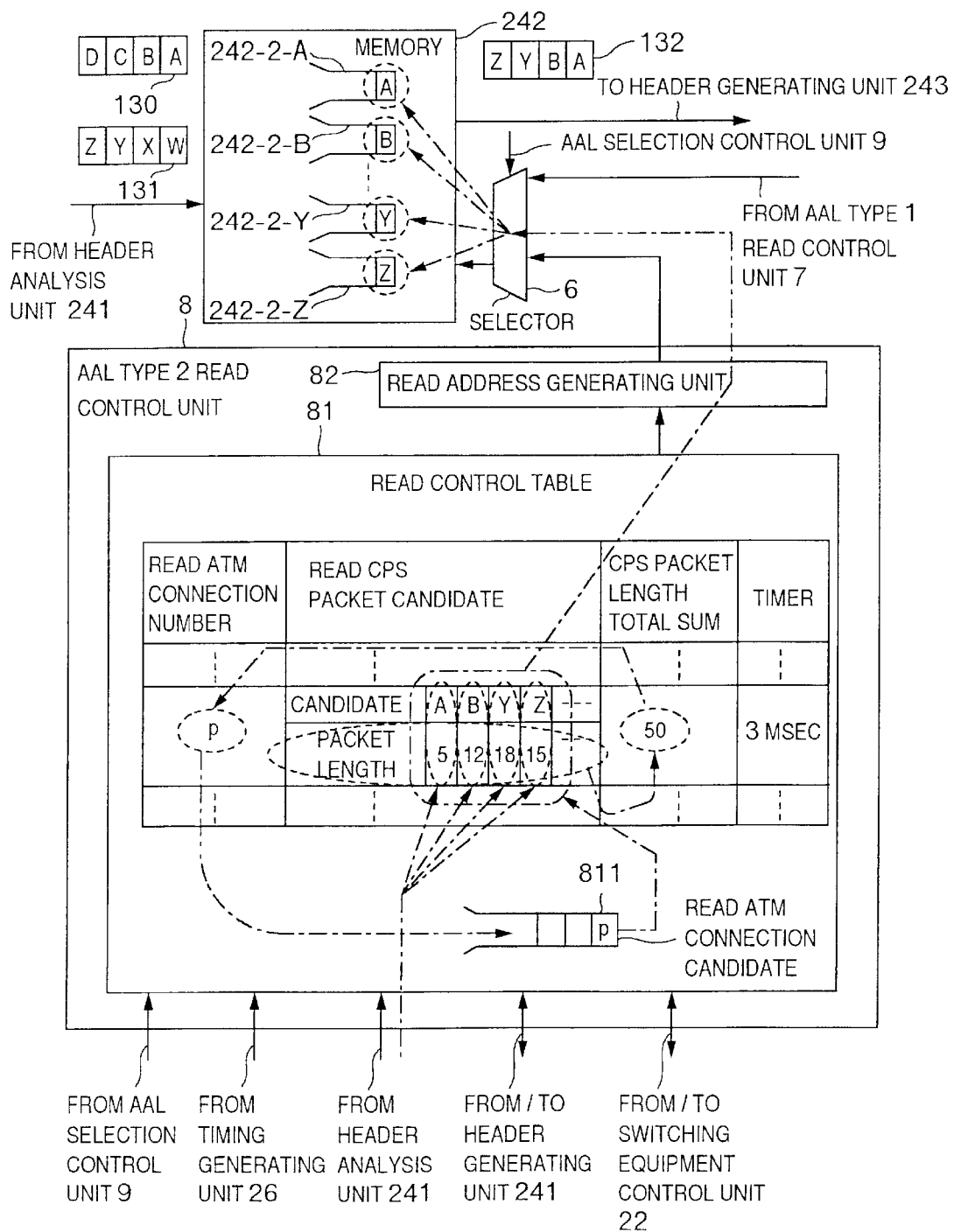
FIG. 11 is a block diagram showing a configuration of an AAL type 2 read control unit 8.

The configuration of the AAL type 2 read out control unit 8 is shown in the form of a block diagram in FIG. 11.

When the data is being written to the memory 242, the information relating to the length of the CPS packet which is stored from the header analysis unit 241 to the memory 242 and the information relating to whether or not the location of interest is the final-location of the packets are transferred to the read control table 81. Now, by the final location of the packets is meant one of the end location of the CPS packets, the final location of the final CPS packet when the packet exceeding the specified value is divided to be transferred as the CPS packets, the final location of the final CPS packet when one packet is generated from a plurality of CPS packets, and the like. Since which information is used as the final location information differs every channel of the CPS packet, that information is set by the switching equipment control unit 22. In addition, the channel numbers of the CPS packets which are to be read out through the connection are successively stored in read ATM connections in the read control table 81. When the CPS packets of the same channel are successively read out, the numbers are stored so as to be continuous. The information relating to the total sum of the lengths of the packets is also stored in the table 81, and in addition thereto, the timer value, e.g., 3 msec, can also be stored in the table 81. Read control table 81 receives input from timing generation unit 26, and transfers from/to header generating unit 241. When the length the information of which is stored has become equal to or larger than 47 bytes, the CPS packet is made the candidate for the generation of the ATM cell.

When the read instruction has been issued from the AAL selection control unit 9, the cell corresponding to the ATM connection of the read candidate is read out. Since in the table 81, there is shown the remainder of the CPS packet which is left since it is more than the last ATM can carry, first of all, the remainder is read out and then the CPS packet for 47 bytes as the read candidate is read out. When only a part of the CPS packet can be read out, the channel number of the CPS packet only a part of which can be read out and the information relating to the remaining data length are both stored in the table. In addition, the table includes the timer table every head ATM connection in order to manage the time in such a way that when the CPS packets have not arrived much, a time to generate the ATM cell does not become long.

A read address generating unit 82 generates a memory read address signal on the basis of the information of the packet which is specified in a read packet candidate storing table 81 to supply the address signal to the memory, which results in the ATM cell signal being able to be read out.

For example, in this figure, the read control table 81 stores therein, every read ATM connection number, the read CPS packet candidates including a set of a plurality of candidates and the packet lengths thereof, the CPS packet length total sum, and the timer. In the figure, there is shown an example in which the data 130 from the header analysis unit 241 first reaches the memory 242 and then the data 131 reaches the memory 242, and thereafter the data of the ATM connection number "p" is read out. "A" and "B" contained in the data 130 which has reached are respectively stored in the areas 242-2-A and 242-2-B in the inside of the memory 242. In this connection, since "C" and "D" in the data 130 are assumed not to have "p" as the ATM connection number, the figure is not illustrated in which "C" and "D" are stored in the memory 242. The information relating to the fact that "A" and "B" in the data 130 having "p" as the read ATM connection number have been stored in the memory 242 is transferred from the header analysis unit 241 to the read table 81, whereby "A" and "B" are shown as the candidates in the column of the read CPS packet candidate of the read ATM connection number "p" of the table, and also the information relating to the packet lengths thereof is also stored therein. At this time, the CPS packet length total sum is also calculated. Since only "A" and "B" are available at this time point, the total sum is 17 (=5+12) and hence this value does not reach the value for one cell. As a result, at this time point, –"A" and "B" are not made the read candidates. Thereafter, the data 131 is inputted to the memory 242 and "Y" and "Z" having "p" as the read ATM connection number are respectively stored in the areas 242-2-Y and 242-2-Z in the inside of the memory 242 and also are stored in the column of the read CPS packet candidate of the read control table 81. At this time, the CPS packet length total sum of the read connection number "p" becomes 50 (=5+12+18+15) so that the length which enables the ATM cell to be formed is obtained. Therefore, in order that the ATM connection number "p" may be made a read object, the ATM connection number "p" is stored in the column of the read ATM connection candidate 811. Thereafter, when the read instruction issued from the AAL selection control unit 9, controlling selector 6, has been received, the ATM connection number "p" in the column of the read ATM connection candidate 811 is read out. Selector 9 also receives input from AAL type 1 read control unit 7. "A", "B", "Y" and "Z" 132 are shown as the read CPS packet candidates of the ATM connection number "p" of the read control table 81 and in accordance therewith, the read address generating unit 82 generates the control signal to read out the data of "A", "B", "Y" and "Z" from the memory 242, to header generating unit 243. While the data of the CPS packets which has been read out is erased from the column of the read CPS packet candidate, with respect to the CPS packet which is left since it is more than the ATM cell can contain therein, the data of the remaining packet length and the like is registered in the column of the read CPS packet candidate. In this connection, the timer of the read control table 81 is the mechanism for preventing, in a certain read ATM connection, the CPS packets from stagnating and also for making, after a lapse of a certain time period, the ATM connection number "p" a read object even if there is no data for one cell.

As set forth hereinabove, according to the present invention, when signals of a plurality of channels which are multiplexed by utilizing the Structured Data Transfer Method of an AAL type 1 or signals of a plurality of channels which are multiplexed by utilizing that Method of an AAL type 2 are transferred, those signals are transferred with those multiplexed. Therefore, the transfer can be carried out economically and with small transfer delay, and further the unit to which those signals are to be transferred can be selected every channel within a network and also the signals can be multiplexed in ATM cells every unit to which the signals are to be transferred.

In addition, according to the present invention, in the case where a voice data decode circuit is provided in a network, the encoded voice data signals are transferred with those signals multiplexed in ATM cells so that the transfer can be carried out economically and with small transfer delay, while the decoded signals are transferred with those signals multiplexed in ATM cells so that the transfer can also be carried out economically and with small transfer delay. Further, the unit to which those signals are to be transferred can be selected every channel within a network and also the signals can be multiplexed in ATM cells every unit to which the signals are to be transferred.

In addition, according to the present invention, the interconnection of network becomes possible in which cells which are ordered into AAL cells with a plurality of kinds of AALs are mixedly transferred, and also it is possible to provide switching equipment, a switching system and a network for transferring the information which is contained in AAL cells by carrying out the conversion of the AAL type or the conversion of the signals (encoding, decoding, encryption or the like of codes) to a desired destination.

Furthermore, according to the present invention, by adopting such a configuration that a normal ATM switch and a upper layer processing switch are distributively arranged in correspondence to the switching function, the upper layer processing switch is suitably arranged in accordance with the load. Therefore, it is possible to provide highly functional ATM switching equipment having various processing functions by which even when ATM cells which are ordered into ATM cells with a plurality kinds of AAL types are mixedly present, the interconnection can be readily carried out. Further, since the upper layer processing switch can be simply selected, installed or exchanged, it is possible to provide switching equipment, a switching system and a network each of which is excellent in maintenance and operation and each of which has an economical configuration.

While the present invention has been particularly shown and described with reference to the preferred embodiments, it will be understood that the various changes and modifications will occur to those skilled in the art without departing from the scope and true spirit of the invention. The scope of the invention is therefore be determined solely by the appended claims.

What is claimed is:

1. An ATM cell switching method comprising:
   inputting a plurality of ATM cells of a first type on which a plurality of channels, having different destinations, are multiplexed;
   switching signals of a plurality of channels multiplexed in the plurality of ATM cells of the first type to respective destinations for each channel;
   converting the switched signals into ATM cells of a second type which a plurality of channels having the same destinations are multiplexed; and
   outputting the converted signals.

2. An ATM cell switching method according to claim 1, further comprising a step of switching, after the ATM cell of the first or second type has been inputted, signals of a plurality of the channels which are multiplexed in the plurality of ATM cells of the first or second type.

3. An ATM cell switching method according to claim 1, wherein the ATM cell of the first type or the ATM cell of the second typo is the ATM cell which is generated by utilizing the Structured Data Transfer Method of an AAL type 1, an AAL type 2 or an AM. type 5.

4. An ATM cell switching method according to claim 1, wherein the ATM cell of the first typo and the ATM cell of the second type are different in AAL type from each other.

5. A switching method comprising the steps of:
   inputting a plurality of ATM cells of a first type and a plurality of ATM cells of a second type which have been generated by multiplexing signals of a plurality of channels having different destinations; and
   switching said signals of the plurality of channels which are multiplexed in the plurality of ATM cells of the first type and the plurality of ATM cells of the second type to respective destinations for each channel, and converting the signals of the channels to the same destinations into the ATM cells of the first type, the ATM cells of the second type or ATM cells of another type which are employed by the same destination to output the resultant ATM cells.

6. Switching equipment comprising:
   an ATM switch accommodating therein a plurality of ATM lines to carry out switching with header information of ATM cells; and
   an ATM upper layer switch having an input and output connected to said ATM switch and inputting ATM cells of a first type on which a plurality of channels having different destinations are multiplexed, signals of the plurality of channels multiplexed in the plurality of ATM cells of the first type being switched to respective destinations for each channel, the switched signals being converted into ATM cells of a second type which a plurality of channels having the same destinations are multiplexed, to output the ATM cells of the second type thus converted to the ATM switch.

7. Switching equipment according to claim 6, wherein said ATM upper layer switch comprises:
   a header analysis unit which analyzes an ATM cell header;
   a memory which stores therein ATM cells of a first type in blocks by said header analysis unit and storing therein ATM cells of a second type every channel of a variable length packet;
   a header generating unit which generates an ATM cell from said memory; and
   a memory control unit which controls said memory and said header generating unit on the basis of the analysis made by said header analysis unit.

8. Switching equipment according to claim 7, wherein said memory control unit comprises:
   a first read control unit which controls the operation of reading out the ATM cell of the first type;

a second read control unit which controls the operation of reading out the ATM cell of the second type; and a selection control unit which selects between said first and second read control units.

9. Switching equipment according to claim 6, wherein said ATM upper layer switch includes a diversity handover processing unit which selects, of a plurality of inputted information, one having the higher quality or composing a plurality of data.

10. Switching equipment according to claim 6, wherein said ATM upper layer switch includes a voice data encoder or a voice data decoder which encodes or decodes the inputted voice information signal.

11. Switching equipment according to claim 6, wherein said ATM upper layer switch includes a packet generating unit and converts the ATM cell of the second type into an ATM cell of a third type.

12. Switching equipment comprising:

a first ATM upper layer switch which accommodates therein a plurality of ATM lines and inputs a plurality of ATM cells of a first type on which a plurality of channels having different destinations are multiplexed, signals of the plurality of channels multiplexed in the plurality of ATM cells of the first type being switched to respective destinations for each channel, the switched signals being converted into ATM cells of a second type which a plurality of channels having the same destinations are multiplexed, the resultant signals being outputted;

an ATM cell switch connected to said first ATM upper layer switch for carrying out the switching with header information of the ATM cells; and a second ATM upper layer switch having an input and an output connected to said ATM cell switch inputting the ATM cells of the first type on which a plurality of channels having different destinations are multiplexed, signals of the plurality of channels multiplexed in the plurality of ATM cells of the first type being switched to respective destinations for each channel, the switched signals being converted into ATM cells of the second type which a plurality of channels having the same destinations are multiplexed, the ATM cells of the second type being outputted.

13. An ATM cell switching method comprising:

inputting ATM cells of a first type on which a plurality of channels, having different destinations, are multiplexed to a network; and switching signals of the plurality of channels multiplexed in the plurality of ATM cells of the first type to respective destinations for each channel; and converting the switched signals into ATM cells of a second type which a plurality of channels having the same destinations are multiplexed; and outputting the converted signals to the network.

* * * * *